(12) United States Patent
Tawara et al.

(10) Patent No.: US 12,705,726 B2
(45) Date of Patent: Aug. 11, 2026

(54) APPEARANCE INSPECTION APPARATUS AND APPEARANCE INSPECTION METHOD

(71) Applicant: Keyence Corporation, Osaka (JP)

(72) Inventors: Kyosuke Tawara, Osaka (JP); Yasuhisa Ikushima, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 492 days.

(21) Appl. No.: 17/958,478

(22) Filed: Oct. 3, 2022

(65) Prior Publication Data

US 2023/0162345 A1 May 25, 2023

(30) Foreign Application Priority Data

Nov. 24, 2021 (JP) ................................. 2021-190175

(51) Int. Cl.
*G06T 7/00* (2017.01)
*G06V 10/778* (2022.01)
*G06V 10/82* (2022.01)

(52) U.S. Cl.
CPC ............ *G06T 7/001* (2013.01); *G06T 7/0004* (2013.01); *G06T 2207/20081* (2013.01); *G06T 2207/20084* (2013.01); *G06T 2207/30164* (2013.01); *G06T 2207/30168* (2013.01); *G06V 10/778* (2022.01); *G06V 10/82* (2022.01)

(58) Field of Classification Search
CPC ........... G06T 7/001; G06T 2207/20081; G06T 2207/30108; G06T 2207/30164; G06T 2207/30168; G06T 2207/20084; G06T 7/0004; G06V 10/82
See application file for complete search history.

(56) References Cited

U.S. PATENT DOCUMENTS

2020/0250801 A1* 8/2020 He ........................ G06T 7/0008
2020/0364841 A1* 11/2020 Hino ...................... G06V 10/82
2020/0364905 A1* 11/2020 Shimodaira .............. G06N 3/02
2020/0402221 A1* 12/2020 Ijiri ........................ G06N 5/046

FOREIGN PATENT DOCUMENTS

JP 2019204321 A 11/2019
WO WO 2021/232149 * 11/2021 ............... G06N 3/08

OTHER PUBLICATIONS

U.S. Appl. No. 17/958,474, filed Oct. 3, 2022 (45 pages).

* cited by examiner

*Primary Examiner* — Vincent Rudolph
*Assistant Examiner* — Timothy Choi
(74) *Attorney, Agent, or Firm* — Kilyk & Bowersox, P.L.L.C.

(57) ABSTRACT

It is possible to quickly present an alternative model without causing deterioration in usability of a user. Learning data is input to a machine learning network to train the machine learning network, and a first inference model configured to perform quality determination of input images is generated. The input images sequentially input to the first inference model and quality determination results of the input images are stored. A process of inputting the plurality of stored input images to the machine learning network to train the machine learning network and generating a second inference model is executed in the background of quality determination processing at the time of inspection. A display screen configured to display quality determination performance of the second inference model is displayed on a display section.

13 Claims, 11 Drawing Sheets

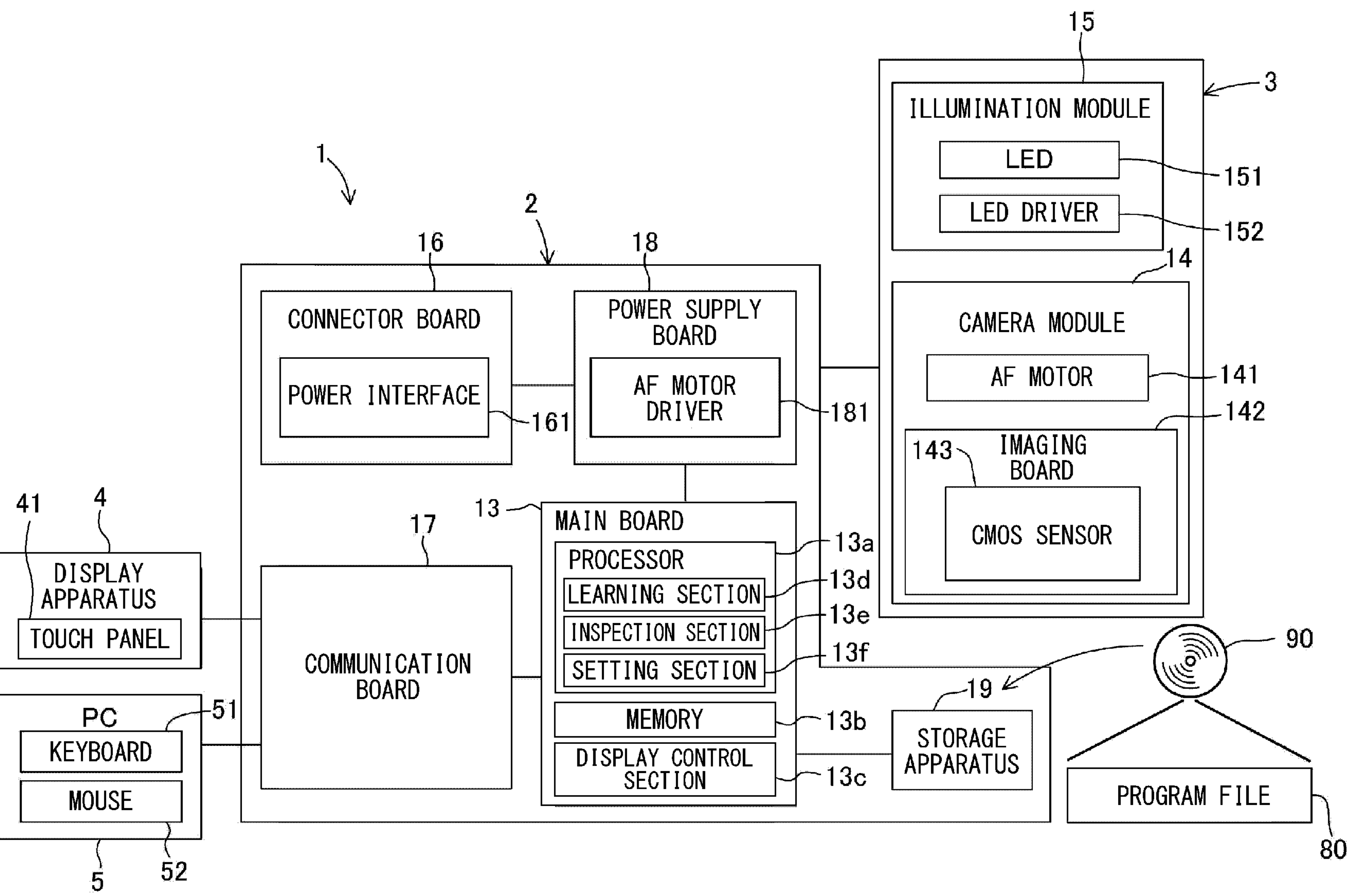
FIG. 2
ILLUMINATION MODULE
LED
LED DRIVER
CAMERA MODULE
AF MOTOR
IMAGING BOARD
CMOS SENSOR
CONNECTOR BOARD
POWER INTERFACE
POWER SUPPLY BOARD
AF MOTOR DRIVER
MAIN BOARD
PROCESSOR
LEARNING SECTION
INSPECTION SECTION
SETTING SECTION
MEMORY
DISPLAY CONTROL SECTION
COMMUNICATION BOARD
DISPLAY APPARATUS
TOUCH PANEL
PC
KEYBOARD
MOUSE
STORAGE APPARATUS
PROGRAM FILE
1
2
3
4
5
13
13a
13b
13c
13d
13e
13f
14
15
16
17
18
19
41
51
52
80
90
141
142
143
151
152
161
181

FIG. 4

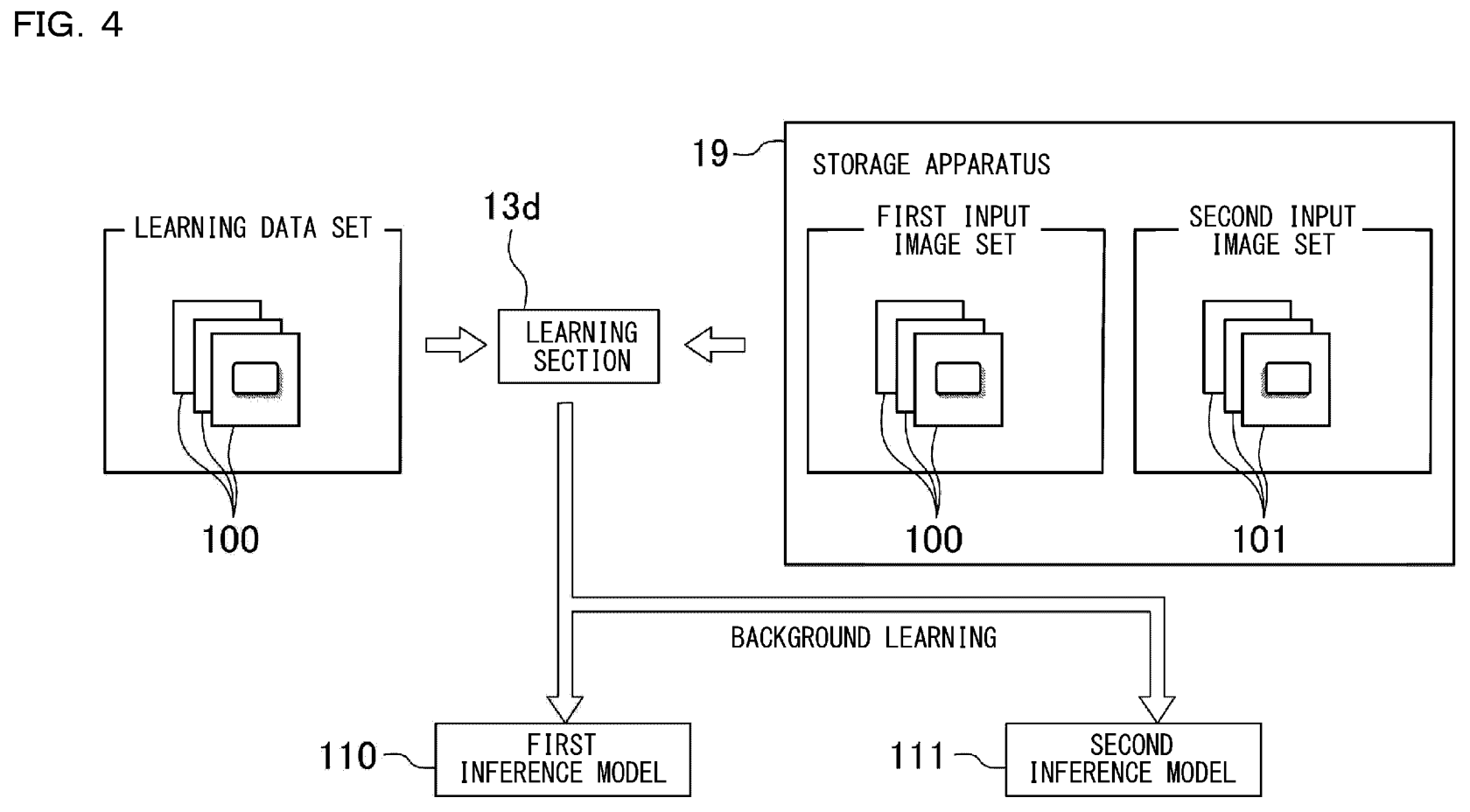

LEARNING DATA SET
100
13d
LEARNING SECTION
19
STORAGE APPARATUS
FIRST INPUT IMAGE SET
100
SECOND INPUT IMAGE SET
101
BACKGROUND LEARNING
FIRST INFERENCE MODEL
110
SECOND INFERENCE MODEL
111

FIG. 7

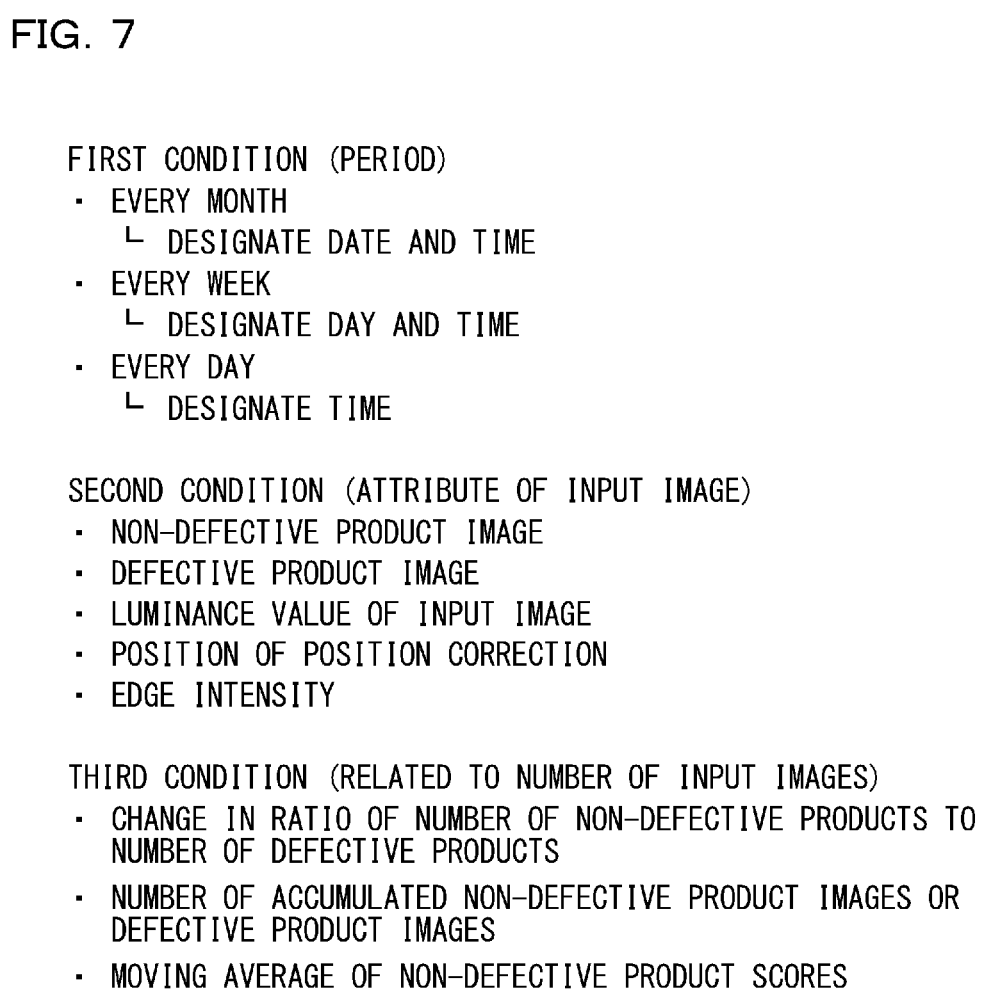

FIRST CONDITION (PERIOD)

- EVERY MONTH
  - └ DESIGNATE DATE AND TIME
- EVERY WEEK
  - └ DESIGNATE DAY AND TIME
- EVERY DAY
  - └ DESIGNATE TIME

SECOND CONDITION (ATTRIBUTE OF INPUT IMAGE)

- NON-DEFECTIVE PRODUCT IMAGE
- DEFECTIVE PRODUCT IMAGE
- LUMINANCE VALUE OF INPUT IMAGE
- POSITION OF POSITION CORRECTION
- EDGE INTENSITY

THIRD CONDITION (RELATED TO NUMBER OF INPUT IMAGES)

- CHANGE IN RATIO OF NUMBER OF NON-DEFECTIVE PRODUCTS TO NUMBER OF DEFECTIVE PRODUCTS
- NUMBER OF ACCUMULATED NON-DEFECTIVE PRODUCT IMAGES OR DEFECTIVE PRODUCT IMAGES
- MOVING AVERAGE OF NON-DEFECTIVE PRODUCT SCORES

FIG. 8

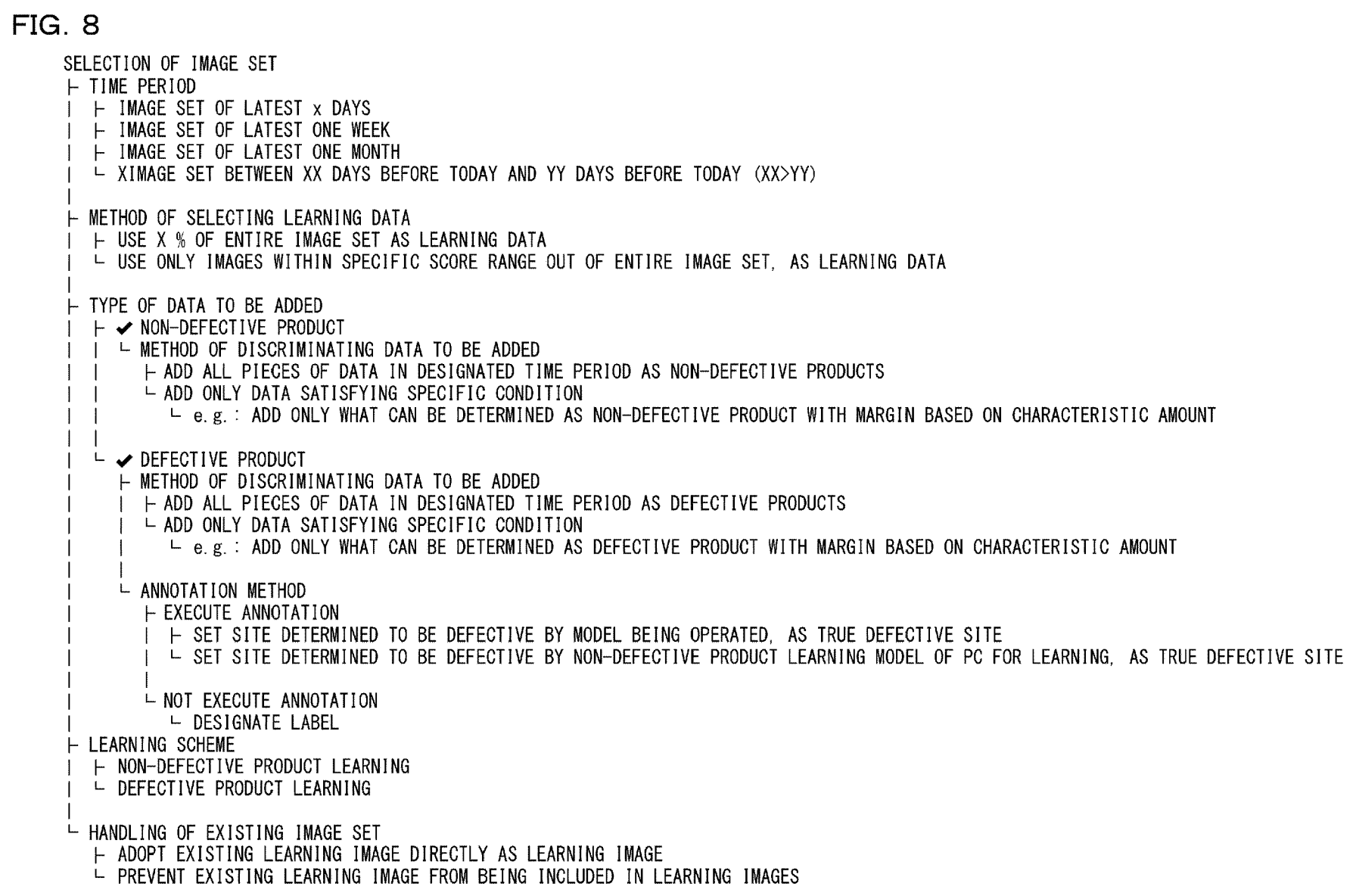

```
SELECTION OF IMAGE SET
├ TIME PERIOD
│ ├ IMAGE SET OF LATEST x DAYS
│ ├ IMAGE SET OF LATEST ONE WEEK
│ ├ IMAGE SET OF LATEST ONE MONTH
│ └ XIMAGE SET BETWEEN XX DAYS BEFORE TODAY AND YY DAYS BEFORE TODAY (XX>YY)
│
├ METHOD OF SELECTING LEARNING DATA
│ ├ USE X % OF ENTIRE IMAGE SET AS LEARNING DATA
│ └ USE ONLY IMAGES WITHIN SPECIFIC SCORE RANGE OUT OF ENTIRE IMAGE SET, AS LEARNING DATA
│
├ TYPE OF DATA TO BE ADDED
│ ├ ✔ NON-DEFECTIVE PRODUCT
│ │ └ METHOD OF DISCRIMINATING DATA TO BE ADDED
│ │    ├ ADD ALL PIECES OF DATA IN DESIGNATED TIME PERIOD AS NON-DEFECTIVE PRODUCTS
│ │    └ ADD ONLY DATA SATISFYING SPECIFIC CONDITION
│ │       └ e.g.: ADD ONLY WHAT CAN BE DETERMINED AS NON-DEFECTIVE PRODUCT WITH MARGIN BASED ON CHARACTERISTIC AMOUNT
│ │
│ └ ✔ DEFECTIVE PRODUCT
│    ├ METHOD OF DISCRIMINATING DATA TO BE ADDED
│    │ ├ ADD ALL PIECES OF DATA IN DESIGNATED TIME PERIOD AS DEFECTIVE PRODUCTS
│    │ └ ADD ONLY DATA SATISFYING SPECIFIC CONDITION
│    │    └ e.g.: ADD ONLY WHAT CAN BE DETERMINED AS DEFECTIVE PRODUCT WITH MARGIN BASED ON CHARACTERISTIC AMOUNT
│    │
│    └ ANNOTATION METHOD
│       ├ EXECUTE ANNOTATION
│       │ ├ SET SITE DETERMINED TO BE DEFECTIVE BY MODEL BEING OPERATED, AS TRUE DEFECTIVE SITE
│       │ └ SET SITE DETERMINED TO BE DEFECTIVE BY NON-DEFECTIVE PRODUCT LEARNING MODEL OF PC FOR LEARNING, AS TRUE DEFECTIVE SITE
│       │
│       └ NOT EXECUTE ANNOTATION
│          └ DESIGNATE LABEL
├ LEARNING SCHEME
│ ├ NON-DEFECTIVE PRODUCT LEARNING
│ └ DEFECTIVE PRODUCT LEARNING
│
└ HANDLING OF EXISTING IMAGE SET
  ├ ADOPT EXISTING LEARNING IMAGE DIRECTLY AS LEARNING IMAGE
  └ PREVENT EXISTING LEARNING IMAGE FROM BEING INCLUDED IN LEARNING IMAGES
```

4
210
211
212
213
SELECTION OF INFERENCE MODEL
INFERENCE MODEL NAME
INFORMATION
RESULT MATCH RATE
MODEL A
LEARNING WITH NON-DEFECTIVE PRODUCT IMAGE DATA ON DD/MM/YY
80%
MODEL B
LEARNING WITH NON-DEFECTIVE PRODUCT IMAGE DATA ON DD/MM/YY
78%
MODEL C
LEARNING WITH DEFECTIVE PRODUCT IMAGE DATA ON DD/MM/YY
100%
MODEL D
LEARNING WITH ENTIRE IMAGE DATA ON DD/MM/YY
100%
...

4
300
305
LEARNING RESULT
NG
OK
score
count
NON-DEFECTIVE PRODUCT IMAGE
DEFECTIVE PRODUCT IMAGE
301
302

4
220
LABELING SCREEN
OK
OK
OK
OK
NG
OK
OK
NG
221
222

APPEARANCE INSPECTION APPARATUS AND APPEARANCE INSPECTION METHOD

CROSS-REFERENCE TO RELATED APPLICATIONS

The present application claims foreign priority based on Japanese Patent Application No. 2021-190175, filed Nov. 24, 2021, the contents of which are incorporated herein by reference.

BACKGROUND OF THE INVENTION

1. Field of the Invention

The disclosure relates to an appearance inspection apparatus and an appearance inspection method for inspecting an appearance of a workpiece.

2. Description of Related Art

For example, Japanese Patent Application Laid-Open No. 2019-204321 discloses an appearance inspection apparatus that determines whether a workpiece is a non-defective product or a defective product using machine learning by a computer.

In the appearance inspection apparatus using the machine learning as disclosed in Japanese Patent Application Laid-Open No. 2019-204321, a large amount of images are input to a machine learning network to train the machine learning network before operation, an inference model is generated, and then, an appearance of the workpiece is inspected when transitioning to the operation.

Meanwhile, a case where a surrounding environment of a workpiece changes during operation of a completed inference model, for example, is conceivable. Specifically, there is a case where a workpiece is irradiated with external light from one side at a certain time, but the workpiece is irradiated with external light from another side at another time, a case where a slight change occurs in a workpiece due to a seasonal factor, or the like. It is difficult for the inference model to follow such a change in the surrounding environment, and there is a possibility that a non-defective product is erroneously determined as a defective product, or a defective product is erroneously determined as a non-defective product.

As described above, quality determination performance sometimes deteriorates due to a lapse of time even in the inference model that has been completed once, but there is no measure that can be taken immediately at a stage where the deterioration in the quality determination performance is confirmed. At present, it is necessary to take a relearning process in which images for learning are collected again and input to the machine learning network to train the machine learning network such that a new inference model is generated.

However, even if learning of the machine learning network is performed using a high-performance computer different from the appearance inspection apparatus, it takes a long calculation time. In this manner, the appearance inspection of the workpiece needs to be stopped for a long time while the relearning process is being executed, which becomes a major problem for the user, and eventually causes deterioration in usability of the appearance inspection apparatus.

SUMMARY OF THE INVENTION

The disclosure has been made in view of such points, and an object thereof is to make it possible to quickly present an alternative model without causing deterioration in usability of a user.

In order to achieve the above object, in one embodiment of the disclosure, it is possible to assume an appearance inspection apparatus that inputs a workpiece image obtained by capturing a workpiece, which is an object to be inspected, to a machine learning network and determines quality of the workpiece based on the input workpiece image. The appearance inspection apparatus includes: a learning section that inputs learning data to the machine learning network to train the machine learning network and generates a first inference model configured to perform quality determination of input images; an inspection section that sequentially inputs the input images to the first inference model generated by the learning section and performs the quality determination of the input images; a storage section that stores the input images sequentially input to the first inference model generated by the learning section and quality determination results of the input images; and a display control section that causes a display section to display the quality determination results obtained by the inspection section. The learning section can execute a process of inputting a plurality of the input images stored in the storage section to the machine learning network to train the machine learning network and generating a second inference model in the background of quality determination processing of the inspection section. The display control section can cause the display section to display a display screen configured to display quality determination performance of the second inference model.

According to this configuration, when the workpiece image is input to the first inference model learned by inputting the learning data, the quality of the workpiece is determined based on the input workpiece image. In addition, the second inference model having a parameter different from that of the first inference model is generated by training the machine learning network with an input image different from an image used at the time of learning of the first inference model. Since the generation of the second inference model is executed in the background of the quality determination processing of the inspection section, it is unnecessary to stop appearance inspection of the workpiece for a long time, and usability of a user does not deteriorate. In addition, at the time of learning of the second inference model, it is possible to generate the second inference model having high quality determination performance for a workpiece image when a surrounding environment of the workpiece has changed as compared with the time of acquiring the learning data of the first inference model, for example, by using an image captured at a time different from the time of acquiring the learning data of the first inference model as the input image. Note that the learning of the second inference model can also be performed, for example, when the quality determination processing by the inspection section is not performed, for example, after the appearance inspection of the workpiece ends, and is not limited to being performed only during the background of the quality determination processing.

When the second inference model is generated, the display screen configured to display the quality determination performance of the generated second inference model is displayed on the display section, and thus, the user can compare quality determination performance of the first inference model and the quality determination performance of the second inference model and select the inference model having higher quality determination performance at that time to continue the appearance inspection of the workpiece.

In addition, a setting section that sets a first condition related to a capturing time period in which an input image used to generate the second inference model has been captured, for example, a date and time may be further provided. In this case, the learning section can acquire the first condition set by the setting section, extract an input image satisfying the acquired first condition from among the plurality of input images stored in the storage section, input the extracted input image to the machine learning network to train the machine learning network, and generate the second inference model.

That is, for example, in a case of a surrounding environment in which a direction of external light with respect to the workpiece changes between the morning and the afternoon in one day, it is possible to extract an image captured at time at which the surrounding environment is different from that at the time of acquiring the learning data of the first inference model as the input image by setting the time as the capturing time period as the first condition. In addition, in a case of a seasonal factor as well, it is possible to extract an image captured on a month and a day in which the surrounding environment is different from that at the time of acquiring the learning data of the first inference model as the input image by similarly setting the month and day or the like as the first condition. Then, the second inference model can be generated using the image captured at the time, the month and day, or the like when the surrounding environment is different, and thus, it is possible to generate the second inference model having high quality determination performance for the workpiece image when the surrounding environment has changed.

In addition, a condition related to a change in a characteristic amount of the input image or a statistical change in the quality determination result may be set as a trigger condition. In this case, when the change in the characteristic amount of the input image or the statistical change in the quality determination result satisfies the condition set by the setting section, learning of the second inference model can be started.

In addition, since the learning section starts the learning of the second inference model in accordance with the trigger condition set in advance, the second inference model can be automatically generated in the background of the quality determination processing.

In addition, the setting section can set a predetermined period as the first condition. In this case, the learning section can extract an input image captured within the predetermined period set as the first condition from among the plurality of input images stored in the storage section, input the extracted input image to the machine learning network to train the machine learning network, and generate the second inference model.

In addition, the setting section can set a second condition related to an attribute of the input image used to generate the second inference model. In this case, the learning section can acquire the second condition set by the setting section, extract an input image satisfying both the acquired second condition and the first condition from among the plurality of input images stored in the storage section, input the extracted input image to the machine learning network to train the machine learning network, and generate the second inference model. As a result, it is possible to use the input image more suitable for the learning of the second inference model based on the first condition and the second condition.

In addition, the setting section can set whether or not the input image used to generate the second inference model is a non-defective product image corresponding to a non-defective product as the attribute included in the second condition. In this case, the learning section can extract an image that satisfies the first condition and is the non-defective product image from among the plurality of input images stored in the storage section as the input image, input the extracted input image to the machine learning network to train the machine learning network, and generate the second inference model.

In addition, the setting section can set whether or not the input image used to generate the second inference model is a defective product image corresponding to a defective product as the attribute included in the second condition. In this case, the learning section can extract an image that satisfies the first condition and is the defective product image from among the plurality of input images stored in the storage section as the input image, input the extracted input image to the machine learning network to train the machine learning network, and generate the second inference model.

In addition, the learning section can extract a defective product image of which a characteristic amount is a predetermined value or more, from among defective product images included in the plurality of input images stored in the storage section.

The setting section according to another embodiment can set a third condition related to the number of input images used to generate the second inference model. In this case, the learning section can acquire the third condition set by the setting section, extract an input image satisfying both the acquired third condition and the first condition from among the plurality of input images stored in the storage section, input the extracted input image to the machine learning network to train the machine learning network, and generate the second inference model.

In addition, the setting section can set, as the third condition, a ratio of B to A when the number of the plurality of input images stored in the storage section is A and the number of the input images used to generate the second inference model is B. In this case, the learning section can extract the number of input images corresponding to the ratio from among the plurality of input images stored in the storage section, input the extracted input image to the machine learning network to train the machine learning network, and generate the second inference model.

In addition, since the learning section can use the learning data, which has been used in generating the first inference model, when generating the second inference model, the number of the input images used to generate the second inference model can be increased.

In addition, the learning section can input verification image data, to which quality information has been added in advance, to each of the first inference model and the second inference model and execute quality determination of the verification image data. The learning section calculates a first match rate, which is a match rate between the quality information of the verification image data and a quality determination result obtained by the first inference model, and a second match rate which is a match rate between the quality information of the verification image data and a quality determination result obtained by the second inference model. The display control section can provide display regions of the first match rate and the second match rate in a display screen configured to compare the quality determination performance of the first inference model and the quality determination performance of the second inference model, and cause the display section to display the display screen, and thus, the user can quantitatively and easily compare the quality determination performance between the first inference model and the second inference model.

As described above, the first inference model is generated using the learning data, the second inference model is generated using the plurality of input images stored in the storage section in the background of the quality determination processing, and the quality determination performance of the generated second inference model can be displayed, so that the quality determination processing can be performed by selecting the inference model suitable at that time. As a result, it is possible to quickly present an alternative model without causing the deterioration in usability of the user.

BRIEF DESCRIPTION OF THE DRAWINGS

FIG. 2 is a block diagram illustrating a hardware configuration of the appearance inspection apparatus;

FIG. 4 is a diagram for describing a learning procedure of a machine learning network;

FIG. 7 is a view illustrating examples of a trigger condition;

FIG. 8 is a view for describing selection of an image set;

DETAILED DESCRIPTION OF PREFERRED EMBODIMENTS

Hereinafter, an embodiment of the invention will be described in detail with reference to the drawings. Note that the following description of the preferred embodiment is merely an example in essence, and is not intended to limit the invention, its application, or its use.

Figure 1:
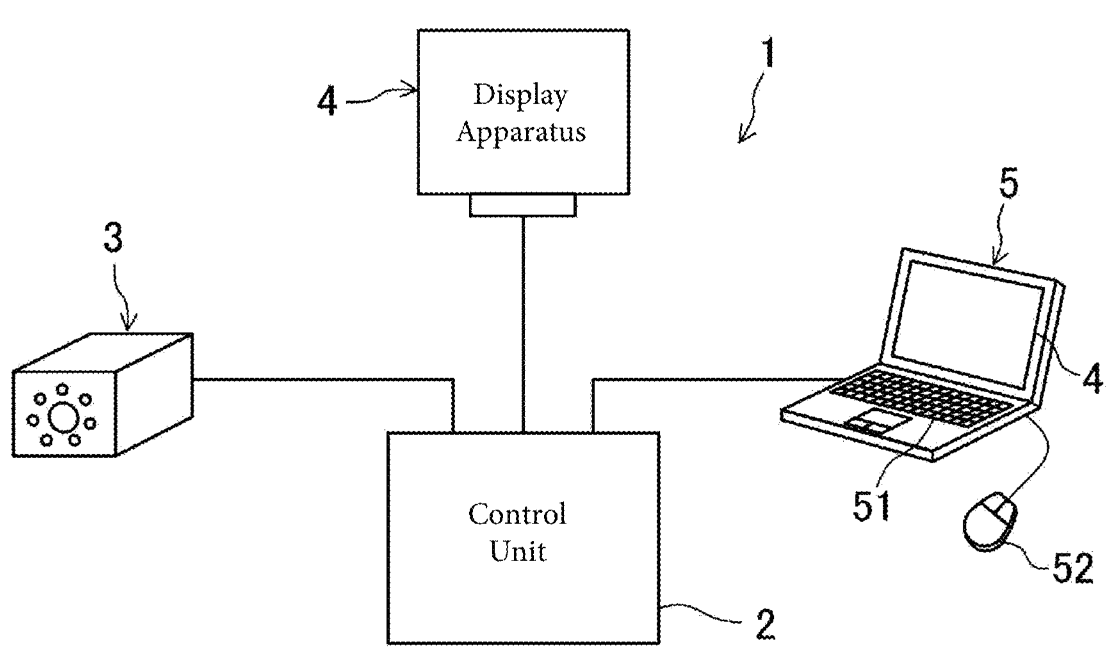
FIG. 1 is a schematic diagram illustrating a configuration of an appearance inspection apparatus according to an embodiment of the invention.

FIG. 1 is a schematic diagram illustrating a configuration of an appearance inspection apparatus 1 according to the embodiment of the invention. The appearance inspection apparatus 1 is an apparatus configured to perform quality determination of a workpiece image acquired by capturing a workpiece as an object to be inspected, such as various components and products, and can be used in a production site such as a factory. Specifically, a machine learning network is constructed inside the appearance inspection apparatus 1. The quality determination of the workpiece image can be performed by the machine learning network by inputting the workpiece image obtained by capturing the workpiece as the object to be inspected to the generated machine learning network.

All workpieces may be used as objects to be inspected, or only some of the workpieces may be used as objects to be inspected. In addition, one workpiece may include a plurality of objects to be inspected. In addition, a workpiece image may include a plurality of workpieces.

The appearance inspection apparatus 1 includes a control unit 2 serving as an apparatus main body, an imaging unit 3, a display apparatus (display section) 4, and a personal computer 5. The personal computer 5 is not essential and can be omitted. Various types of information and images can be displayed using the personal computer 5 instead of the display apparatus 4, and a function of the personal computer 5 can be incorporated in the control unit 2 or the display apparatus 4.

In FIG. 1, the control unit 2, the imaging unit 3, the display apparatus 4, and the personal computer 5 are described as examples of a configuration example of the appearance inspection apparatus 1, but any plurality of these may be combined and integrated. For example, the control unit 2 and the imaging unit 3 can be integrated, or the control unit 2 and the display apparatus 4 can be integrated. In addition, the control unit 2 can be divided into a plurality of units and a part thereof may be incorporated into the imaging unit 3 or the display apparatus 4, or the imaging unit 3 can be divided into a plurality of units and a part thereof can be incorporated into another unit.

[Configuration of Imaging Unit 3]

As illustrated in FIG. 2, the imaging unit 3 includes a camera module (imaging section) 14 and an illumination module (illumination section) 15, and is a unit that executes acquisition of a workpiece image. The camera module 14 includes an AF motor 141 that drives an imaging optical system and an imaging board 142. The AF motor 141 is a portion that automatically executes focus adjustment by driving a lens of an imaging optical system, and can perform the focus adjustment by a conventionally known technique such as contrast autofocus. The imaging board 142 includes a CMOS sensor 143 as a light receiving element that receives light incident from the imaging optical system. The CMOS sensor 143 is an imaging sensor configured to be capable of acquiring a color image. Instead of the CMOS sensor 143, for example, a light receiving element such as a CCD sensor can be used.

The illumination module 15 includes a light emitting diode (LED) 151 as a light emitter that illuminates an imaging region including a workpiece, and an LED driver 152 that controls the LED 151. A light emission timing, a light emission time, and a light emission amount of the LED 151 can be arbitrarily controlled by the LED driver 152. The LED 151 may be integrated with the imaging unit 3, or may be provided as an external illumination unit separately from the imaging unit 3.

(Configuration of Display Apparatus 4)

The display apparatus 4 includes a display panel configured using, for example, a liquid crystal panel, an organic EL panel, or the like. A workpiece image, a user interface image, and the like output from the control unit 2 are displayed on the display apparatus 4. In addition, when the personal computer 5 includes a display panel, the display panel of the personal computer 5 can be used instead of the display apparatus 4.

(Operation Equipment)

Examples of operation equipment configured for a user to operate the appearance inspection apparatus 1 include, but are not limited to, a keyboard 51, a mouse 52, and the like of the personal computer 5, and any equipment configured to be capable of receiving various operations of the user may be used. For example, a pointing device such as a touch panel 41 included in the display apparatus 4 is also included in the operation equipment.

The control unit 2 can detect operations of the user on the keyboard 51 and the mouse 52. In addition, the touch panel 41 is, for example, a conventionally known touch operation panel equipped with a pressure-sensitive sensor, and a touch operation of the user can be detected by the control unit 2. The same applies to a case where another pointing device is used.

(Configuration of Control Unit 2)

The control unit 2 includes a main board 13, a connector board 16, a communication board 17, and a power supply board 18. The main board 13 is provided with a processor 13*a*. The processor 13*a* controls operations of the connected boards and modules. For example, the processor 13*a* outputs an illumination control signal for controlling on/off of the LED 151 to the LED driver 152 of the illumination module 15. The LED driver 152 switches the on/off of the LED 151 and adjusts a lighting time in response to the illumination control signal from the processor 13*a*, and adjusts a light amount and the like of the LED 151.

In addition, the processor 13*a* outputs an imaging control signal for controlling the CMOS sensor 143 to the imaging board 142 of the camera module 14. The CMOS sensor 143 starts capturing and performs the capturing by adjusting an exposure time to an arbitrary time in response to the imaging control signal from the processor 13*a*. That is, the imaging unit 3 captures an image of the inside of a visual field range of the CMOS sensor 143 in response to the imaging control signal output from the processor 13*a*, and captures an image of a workpiece when the workpiece is within the visual field range, but can also capture an image of an object other than the workpiece when the object is within the visual field range. For example, the appearance inspection apparatus 1 can capture a non-defective product image corresponding to a non-defective product and a defective product image corresponding to a defective product by the imaging unit 3 as images for learning of a machine learning network. The image for learning is not necessarily an image captured by the imaging unit 3, and may be an image captured by another camera or the like. The image for learning is learning data that is input to the machine learning network to train the machine learning network.

Meanwhile, the imaging unit 3 can capture an image of a workpiece during the operation time of the appearance inspection apparatus. In addition, the CMOS sensor 143 is configured to be capable of outputting a live image, that is, a currently captured image at a short frame rate at any time.

When the capturing by the CMOS sensor 143 is finished, an image signal output from the imaging unit 3 is input to and processed by the processor 13*a* of the main board 13, and stored in a memory 13*b* of the main board 13. Details of a specific processing content by the processor 13*a* of the main board 13 will be described later. Note that a processing apparatus such as an FPGA or a DSP may be provided on the main board 13. The processor 13*a* may be integrated with the processing apparatus such as the FPGA or the DSP.

The main board 13 is provided with a display control section 13*c*. The display control section 13*c* generates a display screen and controls the display apparatus 4 to display the display screen on the display apparatus 4. A specific operation of the display control section 13*c* will be described later.

The connector board 16 is a portion that receives power supply from the outside via a power connector (not illustrated) provided in a power interface 161. The power supply board 18 is a portion that distributes power received by the connector board 16 to the respective boards, modules, and the like, and specifically distributes power to the illumination module 15, the camera module 14, the main board 13, and the communication board 17. The power supply board 18 includes an AF motor driver 181. The AF motor driver 181 supplies drive power to the AF motor 141 of the camera module 14 to implement autofocus. The AF motor driver 181 adjusts power to be supplied to the AF motor 141 in accordance with an AF control signal from the processor 13*a* of the main board 13.

The communication board 17 is a portion that executes communication between the main board 13, and the display apparatus 4 and the personal computer 5, communication between the main board 13 and external control equipment (not illustrated), and the like. Examples of the external control equipment include a programmable logic controller and the like. The communication may be performed in a wired or wireless manner, and any communication form can be implemented by a conventionally known communication module.

The control unit 2 is provided with a storage apparatus (storage section) 19 configured using, for example, a solid state drive, a hard disk drive, or the like. The storage apparatus 19 stores a program file 80, a setting file, and the like (software) for enabling each control and processing, which will be described later, to be executed by the hardware. The program file 80 and the setting file are stored in a storage medium 90, for example, an optical disk or the like, and the program file 80 and the setting file stored in the storage medium 90 can be installed in the control unit 2. The program file 80 may be downloaded from an external server using a communication line. In addition, the storage apparatus 19 can also store, for example, the above-described image data, parameters for constructing a machine learning network of the appearance inspection apparatus 1, and the like.

That is, in the appearance inspection apparatus 1, the parameters of the machine learning network are adjusted, and an inference model is generated by causing the machine learning network to learn using learning data. It is possible to input a workpiece image obtained by capturing a workpiece as an object to be inspected to the inference model and determine quality of the workpiece based on the input workpiece image. The use of the appearance inspection apparatus 1 enables execution of an appearance inspection method for performing quality determination of a workpiece based on a workpiece image.

(Change in Surrounding Environment of Workpiece)

Here, a change in surrounding environment of a workpiece whose appearance is to be inspected by the appearance inspection apparatus 1 and the appearance inspection method will be described. Assumed is a case where appearances of workpieces are inspected by the appearance inspection apparatus 1 and the appearance inspection method when the workpieces are conveyed along a predetermined conveyance path by, for example, a conveyor or the like. In such a case, images of the workpieces on the conveyance path are generally captured by the imaging unit 3 fixed at a predetermined position, and thus, basically, all of the images of the workpieces are captured at almost the same position, and the workpieces remain in a narrow range in a width direction of the conveyance path even if moving within a visual field range of the imaging unit 3.

It is considered that external light hardly changes if the images of the workpieces are captured at almost the same position, but an irradiation direction of the external light changes with a lapse of time, and the intensity of the external light also changes, for example, in a site where sun light is incident. In addition, a lighting state of an illumination may change between day and night depending on a site, which also causes a change in the irradiation direction and a change in the intensity of the external light.

Figure 3:
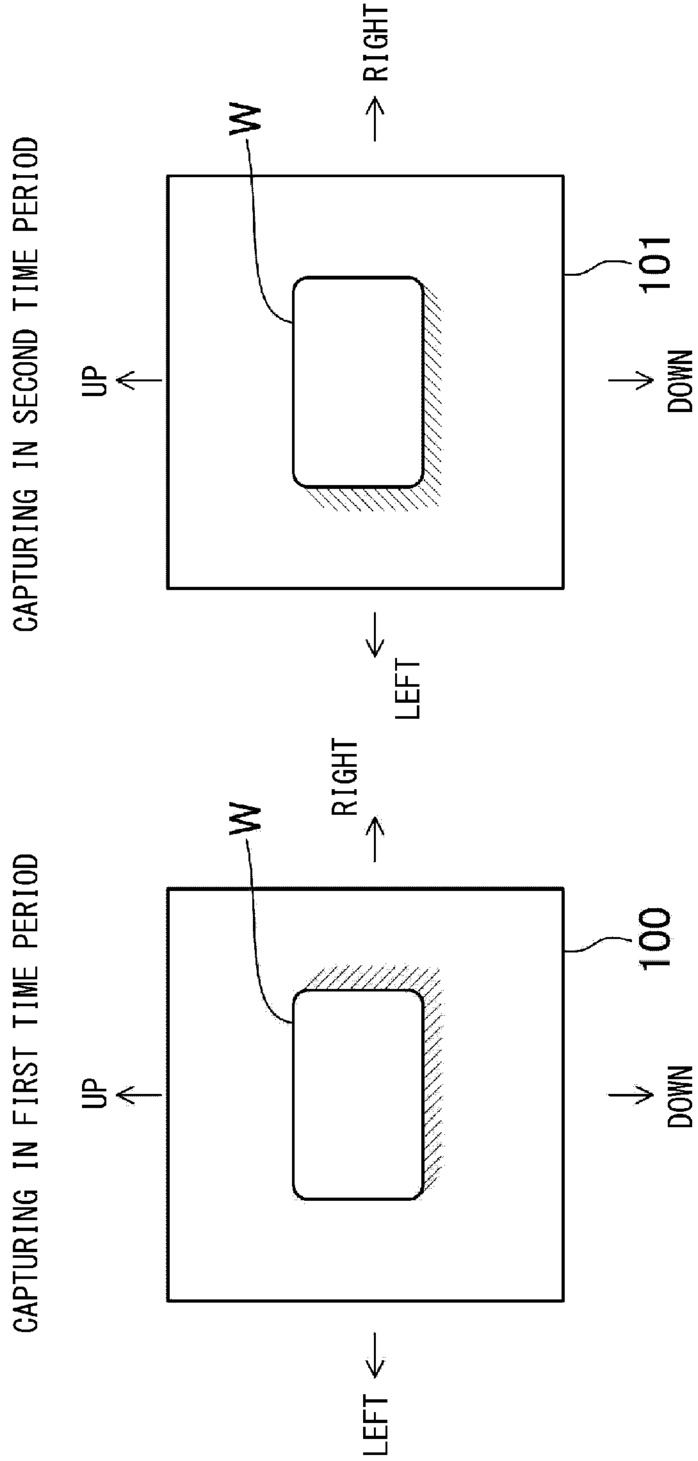
FIG. 3 is a diagram illustrating workpiece images captured at different time periods.

FIG. 3 illustrates a first workpiece image 100 obtained by capturing an image of a workpiece W in a first time period and a workpiece image 101 obtained by capturing an image of a second workpiece W in a second time period different from the first time period. As illustrated in this drawing, there may be a case where external light is applied from the upper left of the workpiece W in the first time period, and external light is applied from the upper right in the second time period. A shadow is formed on the lower right of the workpiece W in the first workpiece image 100 whose image has been captured in the first time period, and a shadow is formed on the lower left of the workpiece W in the second workpiece image 101 whose image has been captured in the second time period, and thus, the first workpiece image 100 and the second workpiece image 101 are different images when viewed as the images even if the workpiece W itself is the same. In addition, there is a case where an image of member in the periphery of the workpiece W is captured as a shadow, and in this case, a position and a shape of the shadow are different between the workpiece image 100 whose image has been captured in the first time period and the workpiece image 100 whose image has been captured in the second time period, and thus, the first workpiece image 100 and the second workpiece image 101 become different images.

In addition, a change in the season may also cause a change in the workpiece W. For example, a workpiece image captured in summer (a first time period) may be different from a workpiece image captured in winter (a second time period).

Further, for example, a workpiece W molded with a mold may be used as an object to be inspected. A shape of the workpiece W sometimes changes between a workpiece W molded with a new mold and a workpiece W molded with a mold after a lapse of a period from the start of use (this is also assumed to be a non-defective workpiece), and a workpiece image captured when the mold is new (in a first time period) is sometimes different from a workpiece image captured when the period has elapsed from the start of use of the mold (in a second time period).

The change in the external light, the change in the season, the change in the mold for molding, or the like correspond to the change in the surrounding environment of the workpiece W. Even for the workpiece W that is recognized to be the same by the user, the workpiece images 100 and 101 are sometimes different due to the change in the surrounding environment of the workpiece W as described above. For example, in a case where only the workpiece image 100 captured in the first time period is input to a machine learning network to train the machine learning network and an inference model is generated, there is a possibility that the workpiece W is erroneously determined to be a defective product despite being a non-defective product if the workpiece image 101 captured in the second time period is input to the inference model. The opposite erroneous determination may also occur. That is, the quality determination performance may decrease due to a change in the surrounding environment of the workpiece W during the operation of an inference model that has been once completed.

The appearance inspection apparatus 1 according to the present embodiment has a configuration capable of quickly responding to the surrounding environment of the workpiece W that has changed during the operation. Hereinafter, an example of such a configuration will be described.

(Configuration of Processor)

As illustrated in FIG. 2, the processor **13*a* is provided with a learning section 13*d*, an inspection section 13*e*, and a setting section 13*f*. The learning section 13*d*, the inspection section 13*e*, and the setting section 13*f* may be portions configured by hardware or portions configured by executing software. In addition, the learning section 13*d*, the inspection section 13*e*, and the setting section 13*f* are not necessarily provided on the main board 13, and some or all of these may be provided on a board other than the main board 13**.

The learning section **13*d* is a portion that inputs learning data to a machine learning network to train the machine learning network, and generates a first inference model 110 (illustrated in FIG. 4) configured to determine quality of an input image. The learning section 13*d* may include, for example, a computer for learning different from the control unit 2. The computer for learning is configured to be capable of performing machine learning at a high speed. Since the computer for learning and the control unit 2 are connected to enable communication therebetween, parameters for constructing the first inference model 110 generated by the learning computer are transmitted to the control unit 2, and the first inference model 110 can be constructed in the control unit 2. A second inference model 111** will be described later.

In addition, the storage apparatus 19 stores a first input image set including a plurality of the first workpiece images 100 as illustrated in FIG. 4. The first workpiece image 100 may be an image captured by the imaging unit 3 by the user or an image captured by a camera different from the imaging unit 3, and is prepared in advance and stored in the storage apparatus 19 in either case. As the first workpiece images 100 constituting the first input image set, both a non-defective product image obtained by capturing a non-defective product and a defective product image obtained by capturing a defective product may be included, or only any one of them may be included.

In FIG. 2, the storage apparatus 19 is expressed as being integrated with the control unit 2, but the storage apparatus 19 may be separate from the control unit 2. Examples of the storage apparatus 19 include a network-attached storage (NAS) and the like. The NAS and the control unit 2 are connected by a communication line such as a wired LAN or a wireless LAN. A second input image set will be described later.

Figure 5:
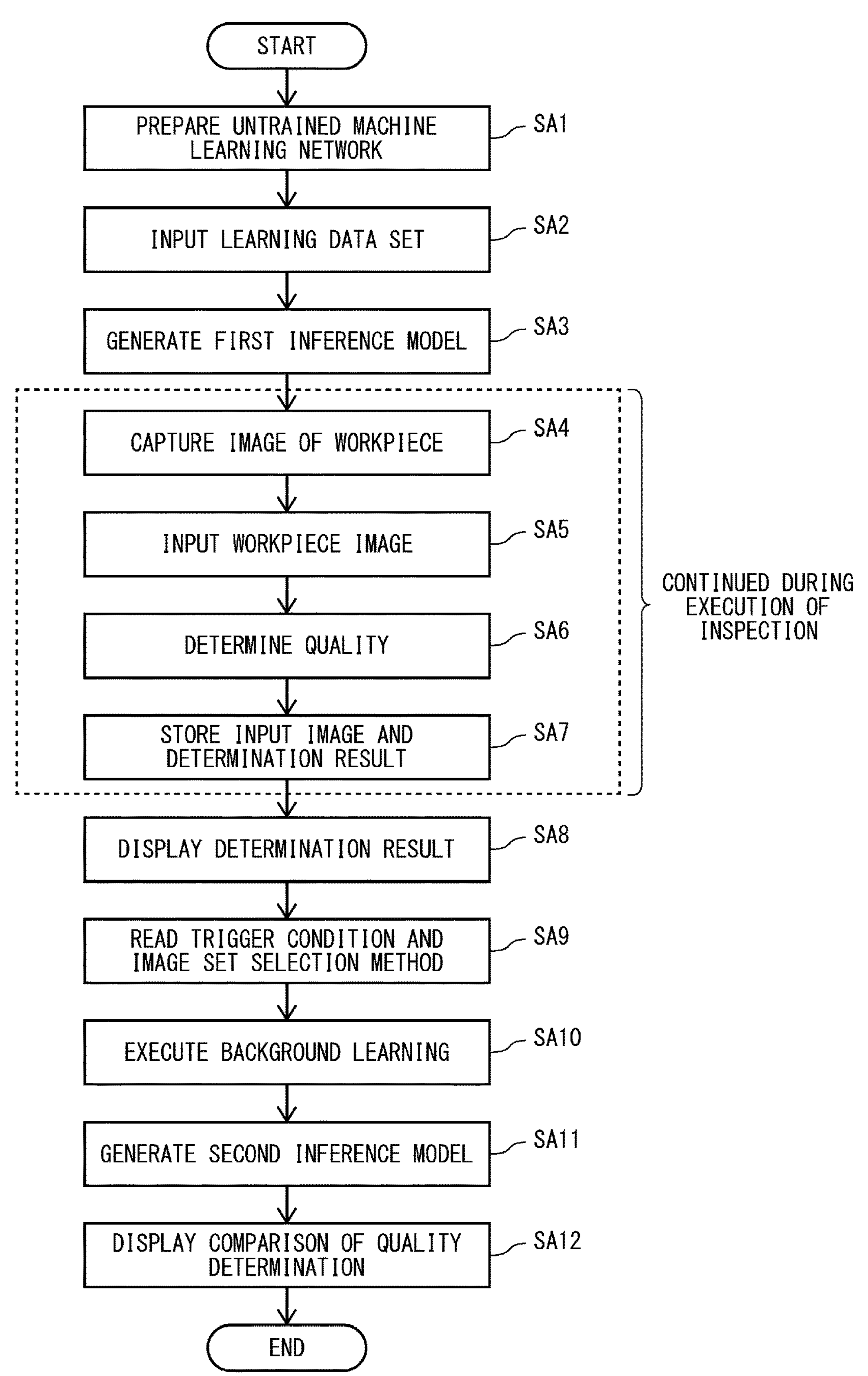
FIG. 5 is a flowchart illustrating an example of a procedure of an appearance inspection method.

FIG. 5 is a flowchart illustrating an example of a procedure of the appearance inspection method. In step SA1 after the start, the learning section **13*d* prepares an untrained machine learning network. In the untrained machine learning network, for example, initial values of parameters are randomly determined. In step SA2, the learning section 13*d* inputs a learning data set to the untrained machine learning network as illustrated in FIG. 4. In the present example, what is the same as the first input image set stored in the storage apparatus 19 can be used as the learning data set. In this case, after reading the first input image set from the storage apparatus 19, the learning section 13*d* sequentially inputs input images constituting the first input image set to the untrained machine learning network. Then, in step SA3, the first inference model 110** is generated. At this time, non-defective product learning may be performed by inputting only a non-defective product image, defective product learning may be performed by inputting only a defective product image, or the both types of learning may be performed. Step SA3 corresponds to a first learning step.

When an input image of the first input image set is a defective product image, an annotation is executed on the defective product image before the input image is input to the machine learning network. That is, the user performs a process of adding a label indicating a defective product image to the defective product image, a process of designating a defective site of the defective product image, and the like in advance. Information on the label added by the annotation and information on the defective site designated by the annotation are stored in the storage apparatus 19 in association with the corresponding defective product image. Therefore, at the time of the defective product learning, parameters of the machine learning network are adjusted using the label information and the defective site information, and the obtained parameters are stored in the storage apparatus 19 or the like. The first inference model 110 can be constructed by the obtained parameters.

After the first inference model 110 is constructed in the control unit 2, the process proceeds to step SA4, and the inspection section 13*e* captures an image of the workpiece W as an object to be inspected by the imaging unit 3 to acquire a workpiece image. Thereafter, the process proceeds to step SA5, and the inspection section 13*e* inputs the workpiece image acquired in step SA4 to the first inference model 110 generated in step SA3. The workpiece image input to the first inference model 110 in step SA5 is an input image. After the input image is input, the inspection section 13*e* determines quality of the input image in step SA6. For example, if there is a site indicating a reaction of a predetermined value or more in an abnormality map output from the first inference model 110, the workpiece of the input image can be determined to be a defective product. On the other hand, if there is no site indicating the reaction of the predetermined value or more in the abnormality map output from the first inference model 110, the workpiece of the input image can be determined to be a non-defective product. A result of the quality determination by the inspection section 13*e* can be acquired in the processor 13*a*. Steps SA5 and SA6 constitute an inspection step.

After step SA6, the process proceeds to step SA7, and the processor 13*a* stores the input image input to the first inference model 110 and the quality determination result of the input image in the storage apparatus 19 in association with each other. Step SA7 corresponds to a storage step.

Steps SA4 to SA7 are repeated while an appearance of the workpiece W is being inspected, that is, during the operation of the appearance inspection apparatus 1. That is, an input image obtained by capturing an image of the first workpiece W, an input image obtained by capturing an image of the second workpiece W, an input image obtained by capturing an image of the third workpiece W, and so on are sequentially input to the first inference model 110, so that quality determination results of the respective input images are sequentially obtained. When the quality determination results are obtained, the input images and the quality determination results of the respective input images are stored, and capturing an image of the workpiece W is stopped at a stage where the operation of the appearance inspection apparatus 1 is stopped.

After step SA7, the process proceeds to step SA8, and the display control section 13*c* causes the display apparatus 4 to display the quality determination results by the inspection section 13*e*. For example, the display control section 13*c* generates a result display user interface screen 200 illustrated in FIG. 6 as an example, and outputs the result display user interface screen 200 to the display apparatus 4. The result display user interface screen 200 is provided with an image display region 201 in which the input image is displayed and a result display region 202 in which the quality determination result is displayed. In the image display regions 201, the input images input to the first inference model 110 are displayed in time series. In the image display region 201, a plurality of input images may be displayed in a list format, or only one input image may be displayed.

The quality determination result is displayed in the result display region 202 for each of the input images, so that one input image and one quality determination result are associated with each other. A display form of the quality determination result is not particularly limited as long as the user can discriminate between a non-defective product and a defective product, and examples thereof can include a character, a symbol, and the like.

Figure 6:
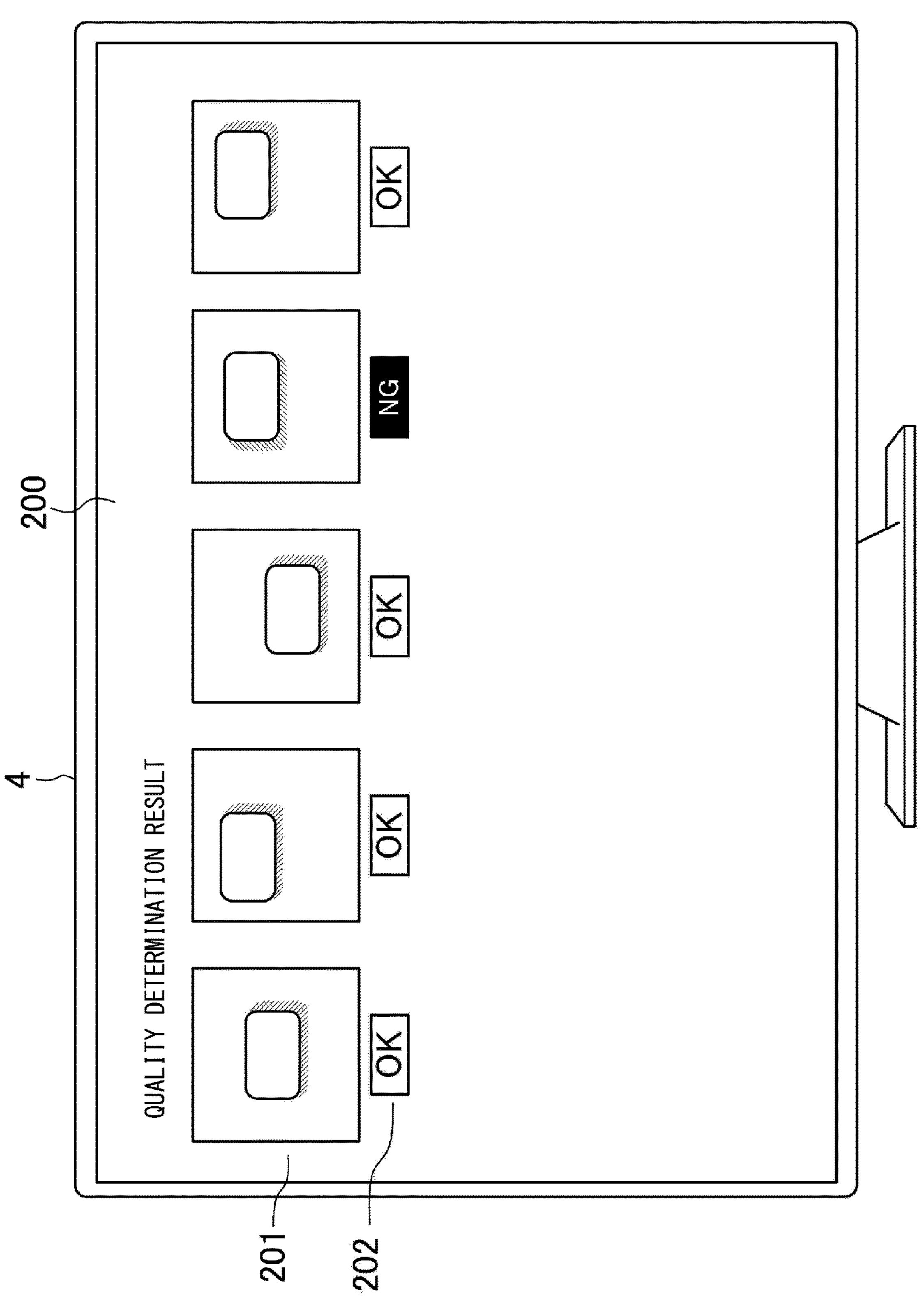
FIG. 6 is a diagram illustrating an example of a result display user interface screen.

As illustrated in FIG. 6, the number of input images and the number of quality determination results also increase as the number of times of appearance inspection increases. That is, the input images and the quality determination results are accumulated in the storage apparatus 19 by repetition of steps SA4 to SA7. The plurality of input images accumulated by the repetition of steps SA4 to SA7 are illustrated as the second input image set in FIG. 4, and are stored in the storage apparatus 19 as the second input image set.

The input images constituting the second input image set are the second workpiece images 101 captured in the second time period after a lapse of time from the time of capturing the first workpiece images 100 constituting the first input image set (the first time period illustrated in FIG. 3). The second input image set is an image set used in background learning to be described later, and is used to generate the second inference model by the background learning.

In step SA9, a trigger condition of the background learning executed in subsequent step SA10 and a method of selecting an image set (the second input image set) used in the background learning are read. The trigger condition is a condition for starting the background learning, and is set by the user in the setting section 13*f* illustrated in FIG. 2. Although details will be described later, FIG. 7 illustrates examples of the trigger condition. In addition, the setting section 13*f* can set a first condition related to a capturing time period in which the input images used to generate the second inference model have been captured, as a condition related to the selection of the image set (illustrated in FIG. 8). Examples of the first condition can include a predetermined period. As illustrated in FIG. 7, examples of the predetermined period can include every month, every week, and every day, a date and time are designated in the case of every day, a day and time are designated in the case of every week, and time is designated in the case of every day. In addition, examples of the predetermined period can include yesterday, the latest two days, the latest three days, . . . , the latest one week, the latest two weeks, . . . , the latest one month, the latest two months, and the like. In addition, examples of the predetermined period can include a period between a first time and a second time (the first time is earlier on a time axis), a period between a first date and a second date (the first date is earlier on a time axis), and the like. In addition, as a method of setting the predetermined period, for example, a method of setting the number of latest input images may be used. For example, when "latest 100 images" are set, a period in which the 100 images have been captured is set.

When setting the predetermined period, the setting section 13_f_ causes the display apparatus 4 to display a setting user interface screen and receives a setting by the user. When the user operates the keyboard 51, the mouse 52, or the like to input a time, a date, the number of sheets, or the like described above, the setting section 13_f_ receives the time, the date, the number of sheets, or the like as a set value and stores the set value in the storage apparatus 19 or the like. In step SA9, the set value may be read from the storage apparatus 19. The setting by the user may be performed at any time, for example, before step SA1, before step SA4, or the like.

The setting section 13_f_ can set a second condition related to an attribute of the input image used to generate the second inference model 111. As illustrated in FIG. 7, for example, whether or not the input image used to generate the second inference model 111 is a non-defective product image corresponding to a non-defective product, whether or not the input image is a defective product image corresponding to a defective product, a luminance value of the input image, a position of position correction, an edge intensity, or the like can be set as the attribute included in the second condition. In this case, it is sufficient for the user to set only the non-defective product image as the input image on the setting user interface screen, and for example, the non-defective product image is made selectable by a check box, a selection button, or the like.

Examples of a method of discriminating a non-defective product image include a method of regarding all workpiece images that have been captured in a certain time period as the non-defective product images, a method of regarding what satisfies a specific condition as the non-defective product image. Examples of the specific condition include a condition that a characteristic amount of the image is less than a predetermined value. That is, a workpiece image that can be determined to be the non-defective product image with a margin based on the characteristic amount is extracted.

In addition, for example, whether or not the input image used to generate the second inference model 111 is a defective product image corresponding to a defective product can be set as the attribute included in the second condition. In this case, it is sufficient for the user to set only the defective product image as the input image on the setting user interface screen, and for example, the defective product image is made selectable by a check box, a selection button, or the like.

Examples of a method of discriminating a defective product image include a method of regarding all workpiece images that have been captured in a certain time period as the defective product images, a method of regarding what satisfies a specific condition as the defective product image. Examples of the specific condition include a condition that a characteristic amount of the image is a predetermined value or more. That is, a workpiece image that can be determined to be the defective product image with a margin based on the characteristic amount is extracted.

The setting section 13_f_ can set a third condition related to the number of the input images used to generate the second inference model. As the third condition, it is possible to set a ratio C of B to A when the number of a plurality of input images stored in the storage apparatus 19 is A, and the number of the input images used to generate the second inference model is B. For example, assuming that 200 input images are accumulated by the repetition of steps SA4 to SA6, A is 200. In a case where it is desired to use only 100 images to generate the second inference model among them, 50% is set as the ratio C on the setting user interface screen. The ratio C may be any value, may be designated by the user, or may be a value stored in advance in the storage apparatus 19.

In addition, the third condition may be the number of accumulated quality images, the number of accumulated defective product images, or the like. Further, the third condition may be a moving average of non-defective product scores or the like. That is, the setting section 13_f_ may be capable of setting a condition related to a score of the input image used to generate the second inference model. When receiving a specific score setting by the user on the setting user interface screen, the setting section 13_f_ sets this as a condition. When the score is to be set, a certain range can be designated.

The setting section 13_f_ can also set execution and non-execution of an annotation for a defective product image. That is, when the execution of the annotation is set on the setting user interface screen, the portion extracted as the defective site in the input image determined to be the defective product in step SA6 is handled as a true defective site.

The setting section 13_f_ can also set whether to generate the second inference model by either non-defective product learning or defective product learning. That is, only non-defective product images are used as the input images when the non-defective product learning is set on the setting user interface screen, and only defective product images are used as the input images when the defective product learning is set.

The setting section 13_f_ can also perform a setting regarding handling of the first input image set used for generation of the first inference model 110. That is, it is possible to set whether or not to use the first input image set for the generation of the second inference model 111 on the setting user interface screen. When it has been set to use the first input image set for the generation of the second inference model 111, the first input image set is input to the machine learning network to generate the second inference model 111. On the other hand, when it has been set not to use the first input image set for the generation of the second inference model 111, the second inference model 111 is generated only with the second input image set without inputting the first input image set to the machine learning network.

The trigger condition for starting the background learning can also be set by the user on the setting user interface screen. As illustrated in FIG. 7, the trigger condition can be set as every day, every week, or every month, for example. The setting section 13_f_ outputs a trigger signal for starting the background learning when the set date and time arrive.

The trigger condition may be automatically set without depending on the setting by the user. For example, the setting section 13_f_ calculates at least one of a ratio of defective product images and a ratio of non-defective product images among the input images accumulated by the repetition of steps SA4 to SA6. When the calculated ratio has changed by a predetermined value or more, the setting section 13_f_ outputs the trigger signal for starting the background learning. In addition, the setting section 13_f_ acquires at least one of the number of defective product images and the number of non-defective product images, and outputs the trigger signal for starting the background learning when one of the numbers is a predetermined number or more.

In addition, the setting section 13_f_ acquires information indicating characteristics of the input images accumulated by the repetition of steps SA4 to SA6, and outputs the trigger signal for starting the background learning when a characteristic of an input image has changed by a predetermined value or more.

In addition, the setting section 13*f* calculates a moving average of scores of non-defective product images among the input images accumulated by the repetition of steps SA4 to SA6, and outputs the trigger signal for starting the background learning when the calculated moving average has changed by a predetermined value or more.

In addition, the setting section 13*f* acquires a luminance value of the input image acquired in step SA4, and regards that an illumination condition has changed when the luminance value has changed by a predetermined value or more, and outputs the trigger signal for starting the background learning.

In addition, the setting section 13*f* acquires a position of position correction of the input image acquired in step SA4 or acquires an edge intensity of the input image acquired in step SA4 and outputs the trigger signal for starting the background learning when the position has changed by a predetermined value or more or when the edge intensity has changed by a predetermined value or more.

In step SA10 of FIG. 5, the background learning is executed according to the preset trigger condition described above. First, the learning section 13*d* acquires the trigger signal when the setting section 13*f* outputs the trigger signal. The learning section 13*d* that has acquired the trigger signal executes a process of inputting the second input image set stored in the storage apparatus 19 to the machine learning network to train the machine learning network and generating the second inference model 111 on the background of the quality determination processing by the inspection section 13*e*. Step SA10 corresponds to a second learning step.

The second input image set may include all the input images accumulated by the repetition of steps SA4 to SA6, or may include only input images satisfying the above condition set by the setting section 13*f*. In a case where no condition is particularly set in the setting section 13*f*, all the input images accumulated by the repetition of steps SA4 to SA6 are set as the second input image set.

In a case where the above condition is set by the setting section 13*f*, the input images constituting the second input image set are extracted as follows. That is, in a case where a first condition related to the capturing time period is set by the setting section 13*f*, the learning section 13*d* acquires the first condition set by the setting section 13*f*, extracts input images satisfying the acquired first condition from the plurality of input images stored in the storage apparatus 19, and constitutes the second input image set only by the extracted input images. In a case where a predetermined period is set as the first condition, the learning section 13*d* extracts input images that have been captured within the predetermined period set as the first condition from among the input images accumulated by the repetition of steps SA4 to SA6. As a result, the second inference model 111 can be generated only with the input images in the period desired by the user.

In a case where a second condition related to the attribute of the input image is set by the setting section 13*f*, the learning section 13*d* also acquires the second condition set by the setting section 13*f*, and extracts input images satisfying both the acquired second condition and the first condition from among the input images accumulated by the repetition of steps SA4 to SA6. As a result, the second inference model 111 can be generated only with non-defective product images acquired within a period, or the second inference model 111 can be generated only with defective product images acquired within the period, the period being desired by the user.

In a case where a third condition related to the number of input images is set by the setting section 13*f*, the learning section 13*d* also acquires the third condition set by the setting section 13*f*, and extracts input images satisfying both the acquired third condition and the first condition from among the input images accumulated by the repetition of steps SA4 to SA6. In a case where the above ratio C is set as a condition of the third condition, the number of input images corresponding to the ratio is extracted from the input images accumulated by the repetition of steps SA4 to SA6.

The learning section 13*d* inputs the second input image set constituted by the input images extracted as described above to the machine learning network to train the machine learning network. In step SA11, a parameter of the machine learning network is adjusted, and the second inference model 111 having a parameter different from that of the first inference model 110 is generated. The obtained parameter is stored in the storage apparatus 19 or the like. The background learning is learning performed during the execution of the quality determination processing by the inspection section 13*e*, in other words, performing the quality determination processing by the inspection section 13*e* and the learning using the second input image set in parallel. When the background learning is performed, it is unnecessary to stop the appearance inspection of the workpiece W for a long time at the time of generating the second inference model 111, and the usability of the user does not deteriorate. Note that the learning of the second inference model 111 can also be performed, for example, when the quality determination processing by the inspection section 13*e* is not performed, for example, at the time of stopping or setting the appearance inspection apparatus 1, for example, after the appearance inspection of the workpiece W ends, and is not limited to being performed only during the background of the quality determination processing.

Steps SA10 and SA11 may be executed a plurality of times. For example, if the trigger condition is every day, steps SA10 and SA11 are executed every day. Therefore, the second inference model 111 increases with a lapse of time, and parameters thereof are stored in the storage apparatus 19 in a distinguishable manner.

In step SA12, the display control section 13*c* causes the display apparatus 4 to display a display screen configured to display quality determination performance of the second inference model 111. At this time, a display screen configured to compare quality determination performance of the first inference model 110 and quality determination performance of the second inference model 111 may be displayed on the display apparatus 4. In addition, a display screen configured to confirm each quality determination performance of a plurality of the second inference models 111 may be displayed on the display apparatus 4.

Step SA12 corresponds to a display step. Before the display, the learning section 13*d* acquires the quality determination performance of the first inference model 110 and the quality determination performance of the second inference model 111. Specifically, the learning section 13*d* inputs verification image data, to which quality information has been added in advance, to the first inference model 110, and executes quality determination of the verification image data in the first inference model 110. Examples of the quality information include a label indicating a non-defective product image, a label indicating a defective product image, and the like. The learning section 13*d* calculates a first match rate which is a match rate between the quality information of the verification image data and a quality determination result by the first inference model 110. When the quality determination result by the first inference model 110 completely matches the quality information of the verification image data, the first match rate is 100%. Note that the verification image data is stored in advance in the storage apparatus 19.

Meanwhile, the learning section 13*d* also inputs the verification image data, to which the quality information has been added in advance, to the second inference model 111, and also executes the quality determination of the verification image data in the second inference model 111. The learning section 13*d* calculates a second match rate which is a match rate between the quality information of the verification image data and a quality determination result by the second inference model 111. In a case where the plurality of second inference models 111 are generated, the second match rate may be calculated using all the second inference models 111 or the second match rate may be calculated by some second inference models 111 among them.

Figure 9:
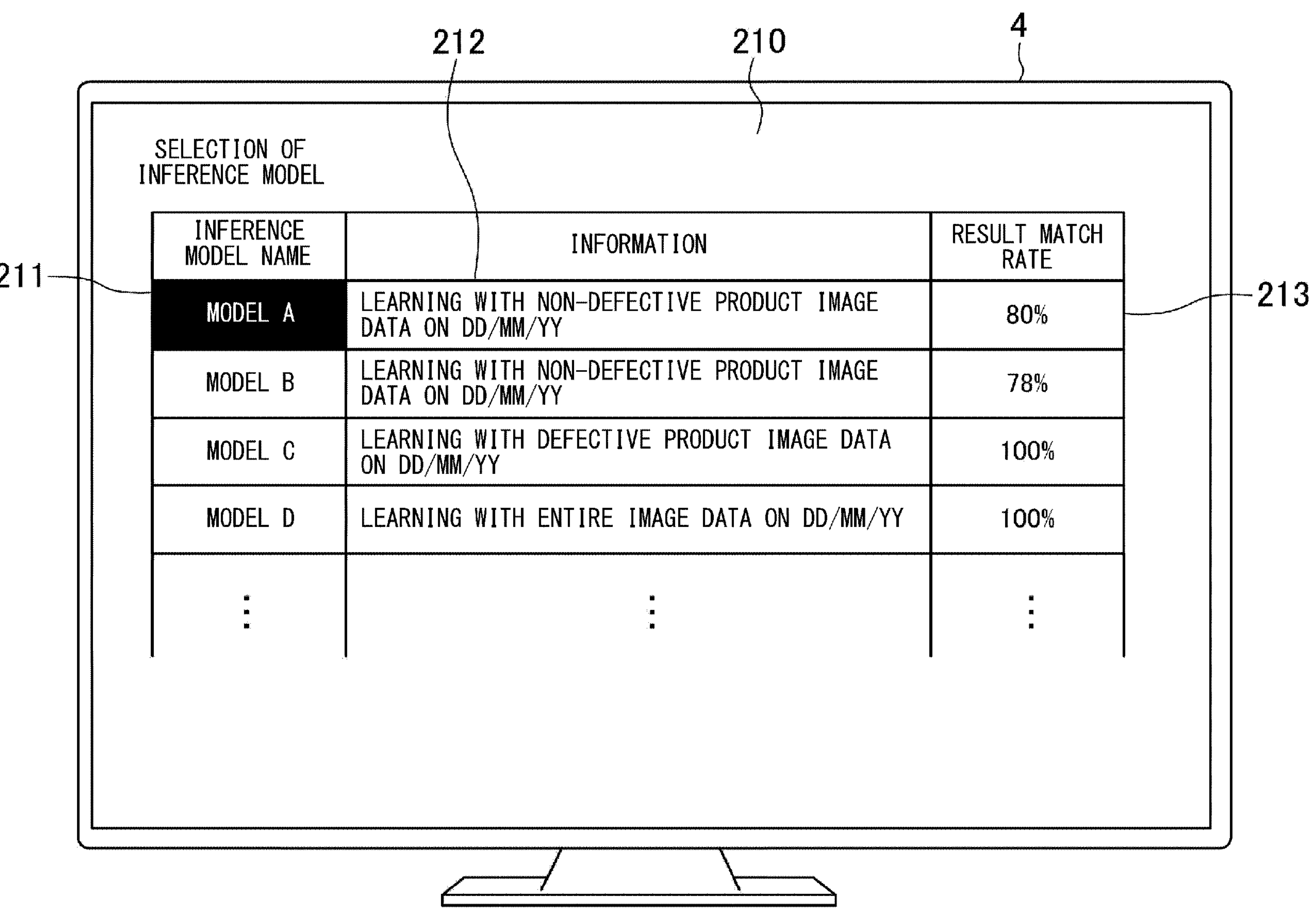
FIG. 9 is a diagram illustrating an example of a model selection user interface screen.

The display control section 13*c* generates a model selection user interface screen (display screen) 210 as illustrated in FIG. 9. The model selection user interface screen 210 is provided with a model name display region 211 for displaying an inference model name, an information display region 212 for displaying information of an inference model, and a match rate display region 213 for displaying a match rate. In the model name display region 211, a name for specifying an inference model generated by the learning section 13*d* is displayed. In this example, Model A is displayed as the first inference model 110 in the model name display region 211, and Model B Model C, Model D, and so on are displayed as the second inference models 111. The name of the inference model can be arbitrarily set, and may be set by the user or may be automatically set according to a specific rule.

In the information display region 212, information related to image data used for learning is displayed in association with a model name as an example of the information of the inference model displayed in the model name display region 211. For example, when learning was performed using acquired image, which one of a non-defective product image, a defective product image, and all images is used for learning, and the like are displayed in the information display region 212.

In the match rate display region 213, a first match rate (match rate by Model A) calculated by the learning section 13*d* and second match rates (match rates by Model B, Model C, Model D, and so on) calculated by the learning section 13*d* are displayed in association with model names. As a result, the user can easily determine which model has high quality determination performance. In addition, it is possible to identifiably display which model is the inference model being operated. FIG. 9 illustrates a case where Model A is being operated.

The user can select a desired inference model from among a plurality of inference models displayed on the model selection user interface screen 210. For example, in a case where it is desired to switch to Model C having a higher match rate during the operation with Model A, the user can perform a selection operation by operating the keyboard 51 or the mouse 52 and aligning a pointer or a cursor with “Model C”. When detecting that Model C has been selected, the processor 13*a* switches Model A to Model C and performs an appearance inspection process for the workpiece W. Although it is necessary to temporarily stop the appearance inspection process for the workpiece W when switching the inference model, such a time is short, and thus, the usability of the user hardly deteriorates.

Figure 10:
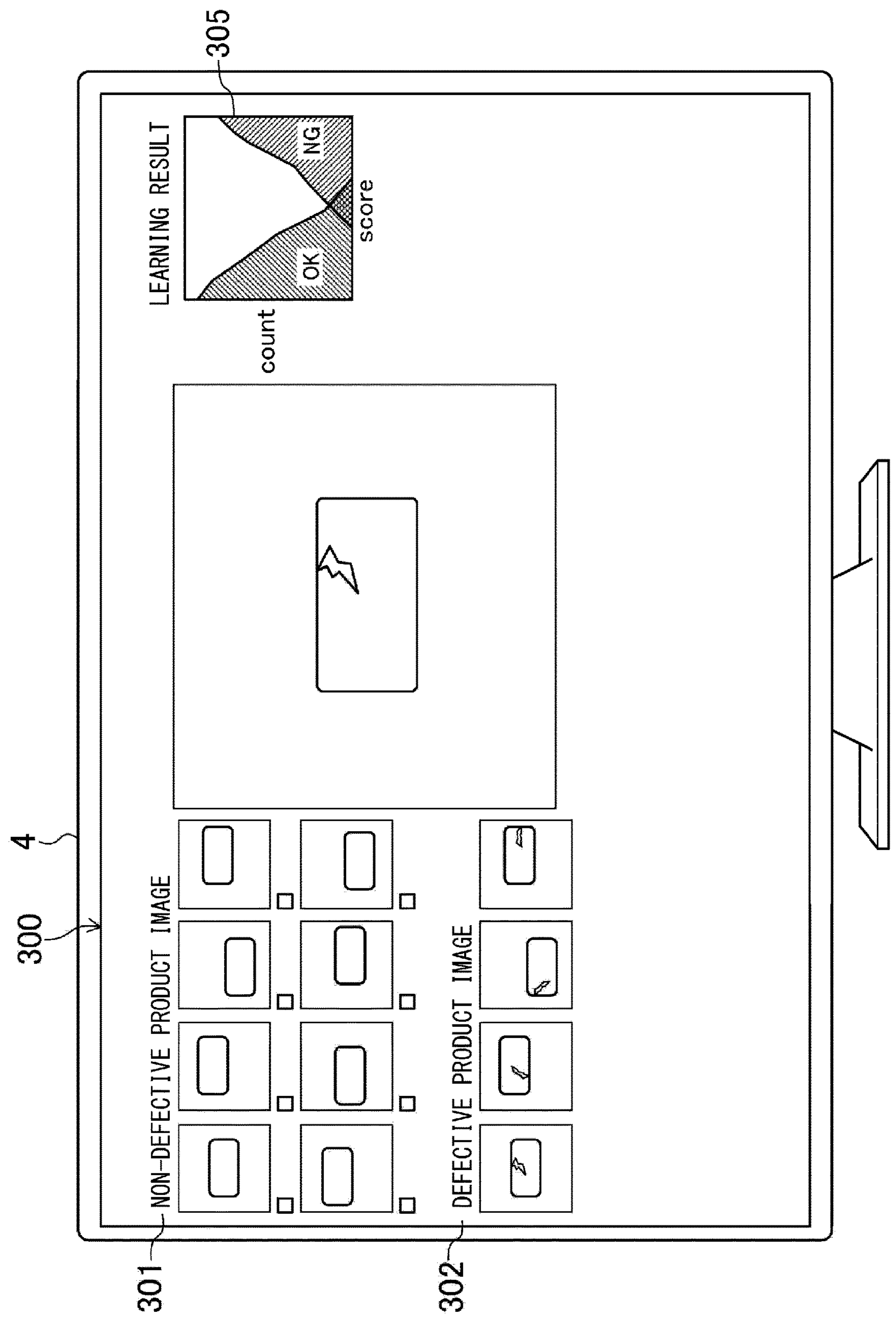
FIG. 10 is a diagram illustrating an example of a user interface screen for confirming quality determination performance of an inference model.

After the user selects the inference model, for example, the screen may transition to a quality determination performance confirmation user interface screen 300 as illustrated in FIG. 10. That is, the processor 13*a* generates the quality determination performance confirmation user interface screen 300 and displays this screen on the display apparatus 4. In the user interface screen 300, the user interface 300 is provided with a non-defective product image display region 301. A plurality of non-defective product images can be displayed in the non-defective product image display region 301. In addition, the user interface 300 is provided with a defective product image display region 302. The processor 13*a* displays an image having a region that is highly likely to be a defective site in the defective product image display region 302 as a defective product image.

Further, the user interface 300 is provided with a learning result display region 305. In the learning result display region 305, a cumulative histogram generated by the processor 13*a* is displayed. That is, the processor 13*a* acquires, as determination results, a frequency of determination as a non-defective product image and a frequency of determination as a defective product image. The cumulative histogram is generated based on the frequency of determination as the non-defective product image and the frequency of determination as the defective product image. The user can determine whether or not a region of the non-defective product image (region described as OK in the drawing) and a region of the defective product image (region described as NG in the drawing) have been separated in the cumulative histogram. When the region of the non-defective product image and the region of the defective product image have not been separated, it is considered that the quality determination performance of the inference model is insufficient. That is, the user can visually confirm the non-defective product image and the defective product image, and can also confirm the quality determination performance of the selected inference model.

(Function of Evaluating Followability to Latest Image)

At the time of learning with the learning data set illustrated in FIG. 4, it is clearly indicated in advance whether each of images constituting the learning data set is a non-defective product image or a defective product image, but the non-defective product image or the defective product image is not clearly indicated for the input images accumulated by the repetition of steps SA4 to SA6 since the images have been just acquired. Therefore, it is sometimes better for the user to assign a label to an image acquired during the operation in order to evaluate how much the inference model has followability with respect to the latest input image. The followability during the operation of the inference model can be evaluated by calculating the above-described match rate.

Figure 11:
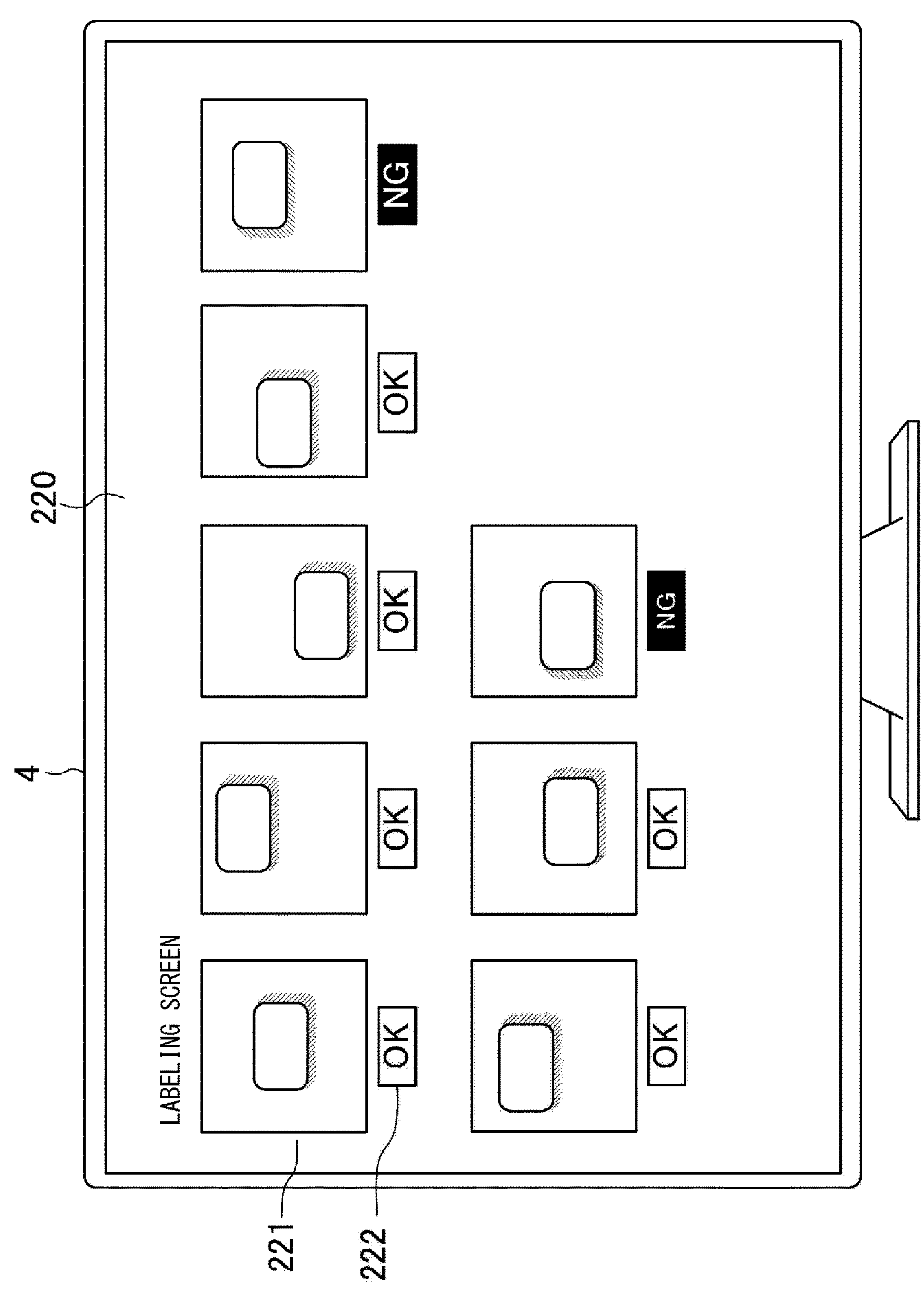
FIG. 11 is a diagram illustrating an example of a labeling user interface screen.

For example, when the user performs a predetermined operation in a state where the model selection user interface screen 210 illustrated in FIG. 9 is displayed, a labeling user interface screen 220 illustrated in FIG. 11 is displayed. The labeling user interface screen 220 is a screen configured to allow the user to manually add one of a label (non-defective product label) indicating a non-defective product image and a label (defective product label) indicating a defective product image to an input image while confirming the input image.

The labeling user interface screen 220 is provided with an image display region 221 and a label setting section 222. The image display region 221 is a region in which the input images accumulated by the repetition of steps SA4 to SA6 are displayed, and a plurality of input images may be displayed in a list format or may be displayed one by one. In the case of the display in the list format, for example, it may be configured such that the user can select one input image from among the plurality of input images, and the selected input image is enlarged and displayed in the labeling user interface screen 220 to facilitate the confirmation of the image.

The label setting section 222 is provided for each input image displayed in the image display region 221. When the user operates the label setting section 222, one of the non-defective product label and the defective product label can be added to the corresponding input image. Information on the input label is stored in the storage apparatus 19 in a state of being associated with the corresponding input image.

Other Functions

Although it is necessary to generate the second inference model 111 a plurality of times in a short time in a case where the trigger condition is satisfied a plurality of times in a short time, for example, it takes time to generate the second inference model 111, and thus, there may be a case where it is difficult to immediately generate the next second inference model 111 even if the next trigger condition is satisfied. In such a case, it is possible to provide a function of sensing completion of generation of the second inference model 111 on the control unit 2 side. When determining that the generation of the second inference model 111 is completed and that the next trigger condition is satisfied, the learning section **13*d* starts to generate the next second inference model 111**.

In addition, the user determines whether or not to adopt the generated second inference model 111 during the operation time, but the invention is not limited thereto, and the determination may be made on the control unit 2 side. For example, in a case where a second inference model 111 having the above-described match rate of a predetermined value or more is generated, or in a case where a second inference model 111 having the match rate higher than that of an inference model currently being operated is generated, the control unit 2 is configured to automatically adopt this second inference model 111 to perform the operation. As a result, the quality determination performance can always be maintained high. In addition, in the case where the second inference model 111 having the above-described match rate of the predetermined value or more is generated, a function of notifying the user of such a fact may be added.

In addition, the same workpiece W may be subjected to appearance inspection on a plurality of lines. In such a case, input images captured in the respective lines may be collected and used for learning of an inference model.

(Specific Method of Learning of Machine Learning Network)

A learning technique of the above machine learning network is not particularly limited, but for example, the following method can be used. That is, the learning of the machine learning network can be performed by minimizing a loss function. Although there are various definitions of the loss, the Mean Square Error (MSE) can be exemplified.

$$\text{Loss} = \frac{1}{n}\sum_{x,y}(T_{x,y} - O_{x,y})^2 \qquad \text{[Formula 1]}$$

Here, T is a target abnormality map, 0 is an output image (abnormality map), n is the number of pixels in which the image T is 0, and x and y are pixel positions. Note that a loss function such as the Binary Cross Entropy can also be used. The above is merely an example.

Functions and Effects of Embodiment

As described above, the machine learning network is trained with an input image different from an image used at the time of learning of the first inference model, and thus, it is possible to generate the second inference model having a parameter different from that of the first inference model on the background of the quality determination processing by the inspection section **13*e***. As a result, it is unnecessary to stop the appearance inspection of the workpiece for a long time when generating the second inference model, and the usability of the user does not deteriorate.

In addition, at the time of learning of the second inference model, it is possible to generate the second inference model having high quality determination performance for a workpiece image when a surrounding environment of the workpiece has changed as compared with the time of acquiring the learning data of the first inference model, for example, by using an image captured at a time different from the time of acquiring the learning data of the first inference model as the input image. As a result, it is possible to select the inference model having high quality determination performance and continue the appearance inspection of the workpiece.

The above-described embodiment is merely an example in all respects, and should not be construed as limiting. Further, all modifications and changes belonging to the equivalent range of the claims fall within the scope of the invention.

As described above, the invention can be used in the case of inspecting an appearance of a workpiece.

What is claimed is:

1. An appearance inspection apparatus that inputs a workpiece image obtained by capturing an image of a workpiece, which is an object to be inspected, to a machine learning network and determines quality of the workpiece based on the input workpiece image, the appearance inspection apparatus comprising:

a learning section that inputs learning data to the machine learning network to train the machine learning network and generates a first inference model configured to perform quality determination of input images relating to a specific type of the workpiece;

an inspection section that sequentially inputs the input images to the first inference model generated by the learning section and performs the quality determination of the input images;

a storage section that stores the input images sequentially input to the first inference model generated by the learning section and quality determination results of the input images, the quality determination results being based on an output from the first inference model; and a display controller that causes a display section to display the quality determination results obtained by the inspection section, a setting section configured to set a trigger condition and a select condition, wherein the trigger condition is for automatically starting a background learning which is executed in a background of performing the quality determination and is specified by at least one of date and time, a change in a characteristic amount of the input images input to the first inference model, and a statistical change in the quality determination results of the input images, the select condition is for automatically selecting a learning image used for the background learning, the learning image being selected among the input images input to the first inference model and stored in the storage, the select condition including at least one of a capturing time period of the learning image and an attribute of the learning image, wherein the learning section selects the learning image among the plurality of input images stored in the storage section in accordance with the select condition, the learning image satisfying the select condition, starts the background learning to generate a second inference model in accordance with the trigger condition executing a process of inputting the learning image to the machine learning network to train the machine learning network, and the display controller causes the display section to display a user interface indicating quality determination performance of the second inference model, the quality determination performance of the second inference model relating to the specific type of the workpiece, and the user interface includes a non-defective product image which is determined based on the output from the second inference model, and a defective product image which is determined based on the output from the second inference model.

2. The appearance inspection apparatus according to claim 1, wherein the display controller causes the display section to display a display screen configured to compare quality determination performance of the first inference model and the quality determination performance of the second inference model.

3. The appearance inspection apparatus according to claim 1, wherein the learning section generates a plurality of the second inference models corresponding to different select conditions set by the setting section, by inputting images selected in accordance with the select conditions to the machine learning network to perform background learning, and the display controller causes the display section to display a display screen configured to compare the quality determination performance among the plurality of second inference models.

4. The appearance inspection apparatus according to claim 1, wherein the setting section is capable of setting a predetermined period as the select condition, and the learning section selects an input image captured within the predetermined period as the learning image.

5. The appearance inspection apparatus according to claim 1, wherein the setting section is capable of setting a first select condition and a second select condition as the select condition, the first select condition relates to a capturing time period in which an input image selected as the learning image being used to generate the second inference model has been captured, the second select condition relates to an attribute of an input image used to generate the second inference model, and the learning image satisfies both the second select condition and the first select condition.

6. The appearance inspection apparatus according to claim 5, wherein the second select condition is being a non-defective product image corresponding to a non-defective product.

7. The appearance inspection apparatus according to claim 5, wherein the second select condition is being a defective product image corresponding to a defective product.

8. The appearance inspection apparatus according to claim 5, wherein the second select condition is a characteristic amount of an image being a predetermined value or more.

9. The appearance inspection apparatus according to claim 1, wherein the setting section is capable of setting a third condition related to an amount of input images used for the background learning to generate the second inference model, and the learning section inputs the learning image to the machine learning network during the background learning in accordance with the third condition.

10. The appearance inspection apparatus according to claim 9, wherein the third condition is a ratio of a learning image amount to an inspection image amount, the inspection image amount is an amount of the plurality of input images input to the first inference model and stored in the storage section, the learning image amount is the amount of the input images used for background learning to generate the second inference model, and the learning section inputs the learning images to the machine learning network during the background learning, so that the amount of learning images corresponds to the ratio.

11. The appearance inspection apparatus according to claim 1, wherein the learning section also uses the learning data, which has been used in generating the first inference model, when generating the second inference model.

12. The appearance inspection apparatus according to claim 1, wherein the learning section inputs verification image data, to which quality information has been added in advance, to each of the first inference model and the second inference model and executes quality determination of the verification image data, and calculates a first match rate, which is a match rate between the quality information of the verification image data and a quality determination result obtained by the first inference model, and a second match rate which is a match rate between the quality information of the verification image data and a quality determination result obtained by the second inference model, and the display controller provides display regions of the first match rate and the second match rate in a display screen configured to compare quality determination performance of the first inference model and the quality determination performance of the second inference model, and causes the display section to display the display screen.

13. An appearance inspection method of inputting a workpiece image obtained by capturing an image of a workpiece, which is an object to be inspected, to a machine learning network and determining quality of the workpiece based on the input workpiece image, the appearance inspection method comprising:

a first learning step of inputting learning data to the machine learning network to train the machine learning network and generating a first inference model configured to perform quality determination of input images;

an inspection step of sequentially inputting the input images to the first inference model generated in the first learning step and performing the quality determination of the input images relating to a specific type of the workpiece;

a storage step of storing the input images sequentially input to the first inference model generated in the first learning step and quality determination results of the input images, the quality determination results being based on an output from the first inference model;

a setting step of setting a trigger condition and a select condition, the trigger condition being for automatically starting a background learning which is executed in a background of performing the quality determination and is specified by at least one of date and time, a change in a characteristic amount of the input images input to the first inference model, and a statistical change in the quality determination results of the input images, the select condition being for automatically selecting a learning image used for the background learning, the learning image being selected among the input images input to the first inference model and stored in the storage, the select condition including at least one of a capturing time period of the learning image and an attribute of the learning image;

a selection step of selecting the learning image among the plurality of input images stored by the storage step, in accordance with the select condition, the learning image satisfying the select condition;

a background learning step to generate a second inference model, which is started in accordance with the trigger condition, including executing a process of inputting a plurality of the learning images to the machine learning network to train the machine learning network; and a display step of causing a display section to display a user interface indicating quality determination performance of the second inference model, the quality determination performance of the second inference model relating to the specific type of the workpiece, the user interface including a non-defective product image which is determined based on the output from the second inference model, and a defective product image which is determined based on the output from the second inference model.

* * * * *